United States Patent [19]

Nakamura

[11] Patent Number: 5,246,762

[45] Date of Patent: Sep. 21, 1993

[54] HEAT-ADHESIVE PAPER SHEET

[75] Inventor: Yasurou Nakamura, Fukuoka, Japan

[73] Assignee: Nakamura Seishisho Co., Ltd., Fukuoka, Japan

[21] Appl. No.: 828,959

[22] PCT Filed: Aug. 2, 1990

[86] PCT No.: PCT/JP90/00992

§ 371 Date: Feb. 4, 1992

§ 102(e) Date: Feb. 4, 1992

[87] PCT Pub. No.: WO91/02120

PCT Pub. Date: Feb. 21, 1991

[30] Foreign Application Priority Data

Aug. 8, 1989 [JP] Japan .................. 1-206038

[51] Int. Cl.$^5$ .............................................. B32B 3/00
[52] U.S. Cl. ................................... 428/172; 428/156;
428/153; 428/182; 428/213; 428/261; 428/262;
428/263; 428/265; 428/290; 428/343; 428/346;
428/354; 428/355; 428/537.5; 428/913
[58] Field of Search ............... 428/156, 153, 172, 343,
428/346, 347, 40, 152, 182, 219, 211, 213, 261,
262, 263, 265, 290, 302, 354, 355, 537.5, 913

[56] References Cited

U.S. PATENT DOCUMENTS 4,125,659 11/1978 Klowak ..................... 428/153
4,202,925 5/1980 Dabroski ..................... 428/219

FOREIGN PATENT DOCUMENTS 36-15781 9/1961 Japan .
38-14404 7/1963 Japan .
50-4029 2/1975 Japan .
53-119313 10/1978 Japan .
54-135221 10/1979 Japan .
54-45417 12/1979 Japan .
59-88998 5/1984 Japan .
61-152435 7/1986 Japan .
63-50320 2/1988 Japan .

Primary Examiner—Donald J. Loney
Attorney, Agent, or Firm—Jordan & Hamburg

[57] ABSTRACT

A heat-adhesive paper sheet suitable for use as fusuma paper and shoji paper in a Japanese style house, wallpaper, ceiling paper, liner for paintings and calligraphic works, and liner for plywood, and which is adhered to the object with heat by ironing. The heat-adhesive paper sheet is composed of a paper sheet material having a projection-depression pattern formed on the surface thereof by creping or embossing or the like and a layer of a thermoplastic thermal shrinking pressure-sensitive adhesive provided on one surface of the paper sheet material. Even though the surface of the object to which the paper sheet is stuck is somewhat rough and uneven, the heat-sensitive adhesive layer may easily be fused so that the paper sheet may be well applied to the object under light pressure without forming wrinkles on the applied sheet. Steam ironing, which has heretofore been unacceptable, is applicable to this paper sheet for sticking it to an object.

8 Claims, 1 Drawing Sheet

HEAT-ADHESIVE PAPER SHEET

FIELD OF ART

The present invention relates to a heat-adhesive paper sheet, which is suitable for use as wallpaper, ceiling paper, or as a liner for plywood, especially as a sliding door, fusuma paper or a paper-sliding screen, shoji paper in a Japanese style house, or as a linear for paintings and calligraphic works, and which can be applied with not only an ordinary iron but also a steam iron.

BACKGROUND OF THE INVENTION

Hitherto, as paper material sheets such as wallpaper, ceiling paper or liner for plywood, especially fusuma paper or shoji paper in a Japanese style house or liner for paintings and calligraphic works, there are known a rewettable fusuma paper or wallpaper having a water-soluble paste as coated and dried thereon, a so-called tacking type adhesive sheet composed of a paper sheet base coated with a release paper via an adhesive therebetween, and a so-called ironing type adhesive sheet.

The above-mentioned water-soluble paste-coated rewettable fusuma paper or wallpaper is prepared by previously coating a water-soluble paste, which is naturally coated to the back surface of said fusuma paper or wallpaper with a brush or roll just before applying the paper to a fusuma or wall, followed by drying the coated paste thereon in the step of forming the fusuma paper or wallpaper. In assuring a smooth and even adherence of the water-soluble paste-coated rewettable fusuma paper or wallpaper to a fusuma or wall, the amount of water to be applied to the paper for rewetting has a great influence on the finished condition. If the amount of water applied thereto is too small, the paper will adhere to the surface of a fusuma or wall before the wrinkles in the paper formed during sticking operation have been stretched out, so that the adhered paper is affixed with wrinkles. On the other hand, if the amount of water applied is too large, the wrinkles formed during the sticking operation could well be stretched but, when the paper base is made of pulp or a similar water-absorbing sheet, the sheet will shrink and draw back the four edges of the sheet before adhesion. As a result, the area of the paper in the finished state is reduced. Fusuma paper that is applied to fusuma in such a way will leave a paperless space between the fusuma paper and the fusuma frame, which is unfavorable. Similarly, the shrunken wallpaper as applied to a wall causes paperless gaps in the paper-to-paper joint area, which are also unfavorable. The amount of water to be applied to a rewettable fusuma paper or wallpaper of the kind varies, depending upon the ambient humidity, so that adjustment of the amount of water to be applied thereto requires high-level of skill.

A so-called tacking type fusuma paper or wallpaper is a means of avoiding the difficult watering process involved in the above-mentioned rewettable fusuma paper or wallpaper. Application of such tacking type fusuma paper or wallpaper to a fusuma or wall is effected by peeling the release paper previously applied to the back surface of the paper so that, with the finish of the sticking operation, the papering of the fusuma or wall is finished. This tacking type fusuma paper or wallpaper has various advantages in that the sticking operation is effected rapidly and that the operating environment is not messy as no water is needed for sticking. However, it has drawbacks in that, since re-sticking is impossible, the stuck paper is often wrinkled and the paper itself is high-priced.

An ordinary ironing type fusuma paper includes a modified type of the above-mentioned rewettable fusuma paper where only the four edges of the paper are dried with a household iron during sticking, and a fusuma paper sheet having a heat-sensitive adhesive laminated or coated on the back surface thereof. The advantages of the former are that the stuck paper hardly wrinkles even if an excess amount of water has been applied to the rewettable fusuma paper, as the peripheral edges of the wetted paper are dried and stuck with an iron. Also the area of the applied paper is not reduced. However, as it needs watering, it has various drawbacks in that the number of operating steps is complicatedly more than with the ordinary rewettable paper and that the operating environment becomes dirty.

The latter heat-sensitive adhesive laminated or coated sheet is one as prepared by laminating or coating a heat-sensitive adhesive onto the back surface of a fusuma paper sheet which is used in an ordinary rewettable fusuma paper, by roll coating or lamination. It is said to have various advantages in that it may easily be stuck without deframing the fusuma, without water and by anyone with a few tools. Sticking may also be effected rapidly because of the characteristic dry adhesion. In fact, however, it has various drawbacks in that it must be stuck only to an evenly planed surface, that it cannot be stuck to a fusuma having an uneven or rough surface, that when it is stuck to a fretwork fusuma, the shade of the inner frets would appear if sticking is effected under too much pressure, and that since no water can be used in sticking, the paper would be elongated to cause wrinkles or swollen areas even though a water mist is applied thereto in sticking. Because of these reasons, only a dry iron can be used. No steam iron can be used, even though it is known that a steam iron is effective for stretching wrinkles out of the paper sheet and for rapid sticking of the paper.

In particular, in the conventional heat-adhesive paper sheet, since the paper material itself is naturally applicable by sticking with a water-soluble paste, application of water thereto causes increase of the water content to result in elongation of the paper sheet, while decrease of the water content by drying results in reduction of the same. Therefore, in sticking with an ordinary iron, there occurs still another drawback in that the water content in the paper material decreases during sticking under heat to yield wrinkles, while the water content therein increases after completion of sticking and the size of the stuck paper is enlarged to cause swelling in the area of the paper with sticking failure.

Therefore, the surface to which a conventional heat-adhesive paper sheet is stuck must be thoroughly planed and flat so that uniform pressure may be applied by ironing, and a high-temperature ironing is needed for the sticking.

The object of the present invention is to provide a heat-adhesive paper sheet, which may be well applied even to an object having an uneven surface, which may be stuck with a steam iron, which may have a good surface condition after sticking, and which may accurately be stuck even at a relatively low temperature in a short period of time.

DISCLOSURE OF THE INVENTION

The heat-adhesive paper sheet of the present invention is characterized by having a thermoplastic thermal shrinking pressure-sensitive adhesive layer on the surface of a sheet material having a projected-depression pattern thereon as formed by creping or embossing.

Regarding creping for forming the projection-depression pattern, there are mentioned two creping means of wet-creping and dry-creping. Both may be employed in the present invention.

The unit size (h) of the projection-depression pattern (height of one projection on one surface) to be effected by creping or embossing varies, depending upon the thickness (D) of the sheet, and is most desirable at approximately ½ to 50 times the thickness (D) of the sheet for creping. This is because, if the projection size (h) by creping is less than ½ of the thickness (D) of the sheet, the influence of elongation and shrinkage of the sheet is directly transferred to elongation and shrinkage of the area thereof; while if it is more than 50 times of the same, the projection-depression pattern would mar the appearance of the paper sheet and would cause uneven adhesion and uneven outward appearance of the sheet. On the other hand, where the projection-depression pattern on the sheet is made by embossing, the optimal depth of the embossing pattern on the embossing roll to be used is from approximately ½ to 50 times the thickness (D) of the sheet. In embossing, the sheet is compressed during the embossing process so that the thickness of the sheet decreases and the embossed projection-depression pattern of the processed sheet would be partly elastically restored, whereby the size (h) of the projection-depression pattern on the embossed sheet would somewhat be smaller than the depth of the embossing pattern on the embossing roll used. However, it has been ascertained by experiments that where the depth of the embossing pattern of the embossing roll to be used is within the above-defined range, the projection-depression pattern as formed on the sheet by embossing may be selectively elongated or shrunk together with the elongation or shrinkage of the sheet so that the sheet is not wrinkled. In addition, even though the surface of an object to which the adhesive sheet of this invention is stuck is somewhat uneven, the suitable depressions on the back surface of the sheet could adhere well to the uneven surface of the object so that the sheet may generally adhere well to the surface of the object. Where the size (h) of the depression on one surface of the sheet is from approximately ½ to 50 times the thickness (D) of the sheet, the size (H) of the projection-depression pattern of both surfaces of the sheet is to be from approximately 3/2 to 50 times the thickness (D) of the sheet.

As mentioned above, since the surface of the sheet is to have a projection-depression pattern formed by creping or embossing, when the hot-pressed area of the adhesive sheet of the invention shrinks in sticking, the height of the projection-depression pattern that is in the boundary area between the hot-pressed area and the non-hot-pressed area is decreased so that the shrinkage of the hot-pressed area does not influence the non-hot-pressed area, and so, no wrinkles are formed in the boundary area or the adjacent area. After the sheet has been applied, elongation or shrinkage of the sheet caused by fluctuation of the humidity or the ambient temperature does not extend in the plane direction but may be absorbed by the cross-sectional elongation and shrinkage of the projections and depressions on the both surfaces of the sheet. As a result, the sheet has no wrinkles.

As the sheet material mentioned above, a synthetic resin sheet having a liner made of a wood pulp mixture may be used in addition to a so-called ordinary paper.

As paper for the sheet material, one made from only thermal shrinking fibers themselves may be used, as well as one made from a mixture containing thermal shrinking fibers.

For instance, one may use paper made from a single substance of natural bast fibers of, for example, paper mulberry, mitsumata (*Edgeworthia papyrifera*), gampi (*Wikstroemia sikokiana*) or hemp, or cellulose, fibers of, for example, wood pulp, cotton linter pulp or rayon, or from a composite substance of them.

To the above-mentioned raw material, may be added inorganic fibers such as glass fibers, micro glass, rock wool, slag wool, alumina fibers, alumina-silica fibers, mullite fibers, boric acid fibers, quartz fibers, silicate glass fibers, molten silica fibers, potassium titanate fibers, zirconia fibers, calcium sulfate fibers, phosphate fibers, borosilicate fibers, carbon fibers, active carbon fibers, etc.

Further, vinylon fibers may be added thereto.

As the case may be, and in accordance with the use, silicates such as pagodite, kaolin, sericite, talc or zeolite, as well as other fillers such as calcium carbonate, titanium dioxide, aluminum hydroxide, alumina, silica or magnesia can be added to the material.

Further, various organic binders, including a paper strength enhancer such as water-soluble urea resin, melamin resin, cationated starch, CMC polyamido-polyamine-epichlorohydrin resin, polyimine resin, water-soluble acrylic resin, methyl cellulose, ethyl cellulose or hydroxyethyl cellulose, as well as sizing agents such as maleic acid neutral sizing agent, rosin sizing agent, petroleum sizing agent, high polymer resin emulsion or rubber latex may also be added thereto.

In addition, polyvinyl alcohol or SPG may also be employable as a binder.

As another employable embodiment, the above-mentioned paper is used as a liner, the surface of the liner is coated with a vinyl chloride resin, the coated resin is treated to make it air-permeable by the technique illustrated in Japanese Patent Unexamined Publication No. 59-88998, and the surface of the paper sheet is subjected to various decorative and other necessary for wallpaper, including printing, foaming, embossing, flame-proofing or fire-retardation treatment.

As still another employable embodiment, the above-mentioned paper is used as a liner, and the surface of the liner is laminated with a woven fabric, knitted fabric, non-woven fabric, heat-resistant synthetic leather, thin cork skin, thin wood skin (for relief laminate), metal foil, mineral net or natural leather, or a composite of such, in a way that the resulting laminate is steam-permeable.

In addition to the above-mentioned substances, any and every other known base sheet for wallpaper, which may allow permeation of ironing steam and which neither shrinks too much nor fuses with ironing heat, may be used in the present invention.

As the above-mentioned paper, paper containing hydrophobic thermal shrinking fibers may be used. For the purpose of improving the dimensional stability of the base sheet when exposed to fluctuation of ambient humidity and temperature, the paper for use in the invention preferably contains from 5 to 100% of hydrophobic thermal shrinking fibers.

More specifically, it is desirable for the paper to be composed of from 5 to 100% hydrophobic thermal shrinking fibers so that the heat-adhesive paper sheet may shrink during the application of the sheet and that, after completion of application, the adhered sheet may have improved dimensional stability when exposed to fluctuation of ambient humidity and temperature.

From among the above-mentioned paper materials, formulations suitable to the use of shoji paper or liner for paintings and calligraphic works are selected. For laminate paper, those not causing peeling of the respective laminate layers are selected.

The surface of the paper sheet for use in the present invention may be printed by flexo-printing, gravure-printing or screen-printing or may be resin-coated for the purpose of protecting it from staining, or it may further be processed for other decoration. In any case, the thus processed paper sheet must be steam-permeable for applicability to steam ironing.

Where the above-mentioned paper material is used as a liner and the surface thereof is coated with a vinyl chloride resin, it is first processed for imparting gas-permeability thereto by the method described in Japanese Patent Unexamined Publication No. 59-88998 so that it may be steam-permeable. Thereafter, any other necessary processing, such as printing, foaming, embossing, flame-proofing, or fire-retardation treatment, is applied thereto.

In addition, the liner may be a steam-permeable sheet laminated with a woven fabric, knitted fabric, non-woven fabric, heat-resistant synthetic resin layer, thin cork skin, metal foil, mineral net or leather on the surface thereof.

For forming other sheets of the invention applicable to steam-ironing, any materials may be employed which neither shrink too much nor become fused by the heat in ironing.

As hydrophobic thermal shrinking fibers for use in the invention, suitable are fibers of a single substance of polyethylene, polypropylene, polyester, polychlal, acrylic polymer, polymers of vinyl acetate or derivatives thereof, or of a composite substance of them. Suitable fibers and their content may be determined in accordance with the property of the article to which the adhesive sheet is applied.

The heat-sensitive adhesive to be used in preparing the sheet of the invention may be selected from EVA, EEA, EAA, ionomer resins, urethane resins and derivatives of them having a melting point from 60° C. to 150° C., in accordance with the use of the sheet, and the thickness of the adhesive layer in the sheet may be selected from the range of 10 to 100 $\mu$m, preferably from 15 to 50 $\mu$m, for the purpose of attaining suitable adhesion power and shrinking power.

As an adhesive layer, it is preferable to laminate a thermoplastic, thermal shrinking, pressure-sensitive adhesive synthetic resin film on the paper sheet material to form a laminated adhesive layer thereon having a thickness from approximately 10 to 100 $\mu$m, preferably from 15 to 50 $\mu$m. Since the adhesion power and shrinking power are required, if the thickness of the layer is less than 10 $\mu$m, the filmed layer will be uneven so that the adhesion power and shrinking power would be too weak. On the other hand, if it is more than 100 $\mu$m, sufficient heating of the paper sheet with a household iron will be impossible in a short period of time so that adhesion and shrinkage would be unfavorably uneven.

As the above-mentioned synthetic resin for forming the adhesive layer, there are concretely mentioned ethylene-vinyl acetate copolymer (EVA), ethylene-ethyl acrylate copolymer (EEA), ethylene-acrylic acid copolymer (EAA), ionomer resins, urethane resins and derivatives of them, which have a melting points from 60° to 150° C. From among them, those suitable may be selected for use in the present invention.

In accordance with the present invention, since the sheet has a projection-depression pattern as formed by creping or embossing, the height (or depth) of each projection and each depression in the boundary area between the hot-pressed area and the non-hot-pressed area decreases when the hot-pressed area is shrunk for adhesion, so that the influence of the shrinkage of the hot-pressed area is not transmitted to the non-hot-pressed area, and therefore the boundary area and the adjacent area do not shrink. After adhesion, elongation or shrinkage of the sheet due to fluctuation of ambient humidity or temperature does not extend to the plane direction of the sheet but is absorbed by elongation or shrinkage of the projections and depressions (as being on the surface of the sheet) in the cross-sectional area. As in result, the sheet does not shrink despite the fluctuation of ambient humidity or temperature after adhesion.

The heat-adhesive paper sheet of the present invention may be applied to an object as in the following example.

First, a heat-adhesive paper sheet of the present invention, having a somewhat larger area than the area to which it will be applied, is applied to the intended surface, and the four corners of the sheet are lightly hot-pressed with a household steam iron heated at 180° to 200° C., the pressing power being about equal to the weight of the iron used. The reason why a steam iron is used for the hot-pressing is as follows: The surface of the object to be covered with the paper sheet is generally uneven. For instance, where a heat-adhesive paper sheet of the invention is applied to a fretwork fusuma by hot-pressing, the pressure-sensitivity noticeably differs between the frets and the fret-free plane base in the fretwork fusuma. Regarding a sliding fusuma, the bottom surface of an iron could not be uniformly applied to the warped and uneven surface of the fusuma. As a result, where the pressing power is not sufficient, the amount of heat to be transmitted to the adhesive paper sheet is insufficient when an ordinary dry iron is used, so that the layer of the heat-sensitive adhesive in the sheet will not heat to the melting point and will often cause adhesion failure. However, if a steam iron is used in place of a dry iron, not only the heat conduction of the sheet itself but also the heat conduction of the steam from the iron may be evenly attained so that sure adhesion of the sheet is achieved without elevating the temperature of the iron used to such a high temperature that the sheet burns.

Next, the excess area of the (temporarily) adhered paper sheet are cut off and hot-pressure adhesion of the four corners of the sheet is effected to determine the position thereof on the object. For finally sticking the center part of the sheet, the sheet is gently ironed from the center part to the periphery area in order, the ironing pressure being equal to the weight of the iron and the light hand-pressure of the operator. Lastly, the four edges of the sheet are slowly hot-pressed. Accordingly, the adhered condition of the four edges of the sheet is such that the projections of the sheet are made flat because of the hot pressure applied thereto so that the contact area is enlarged and sufficient adhesion of the sheet to the object is attained.

Since the center part of the sheet is heated and lightly pressed, the sheet is shrunk and the whole is thereby stretched. However, since the sheet has a projection-depression pattern as formed by creping or embossing, superfluous shrinkage of the sheet in the plane direction may be absorbed by the shrinkage of the projections and depressions in the height (or depth) direction so that the sheet is neither shrunk in the plane direction nor wrinkled. The back of each depression of the projection-depression pattern of the sheet is adhered to the object. More precisely, the four edges of the sheet are adhered to the object by plane contact, while the center part is adhered thereto microscopically by spot contact or line contact. Therefore, even though the applied sheet is elongated or shrunk because of variations in ambient humidity and temperature, the non-adhering portions except for the above-mentioned spot-stuck or line-stuck portions are elongated or shrunk in the thickness direction so that the sheet is neither badly wrinkled nor badly swollen.

The heat-adhesive paper sheet of the present invention, having the above-mentioned constitution, displays the following advantageous effects.

① Where a part of a broad sheet is hot-pressed with an iron to adhere it to an object, the shrinkage of the hot-pressed area in the plane direction may be well absorbed by shrinkage of the projections and depressions in the height (or depth) direction, so that the sheet is not wrinkled.

② After adhesion of the sheet, the elongation and shrinkage of the sheet due to fluctuation of ambient humidity and temperature may be absorbed by elongation or shrinkage of the projections and depressions in the height (or depth) direction, so that the sheet is neither wrinkled nor swollen.

③ The sheet may be used as fusuma paper, shoji paper, wallpaper, liner for paintings and calligraphic works, or liner for plywood, and may be easily adhered to the object, without forming wrinkles in the adhered sheet, by anyone with household appliances.

Figure 1:
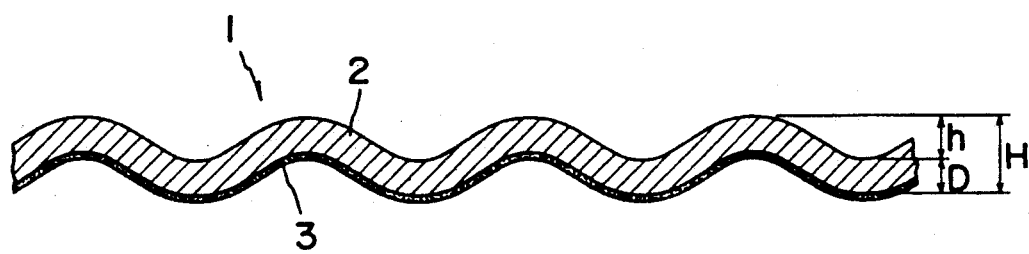
FIG. 1 shows an enlarged cross-sectional view of a heat-adhesive paper sheet of an embodiment of the present invention.

In the drawing, 1 is a heat-adhesive paper sheet of the embodiment; 2 is a paper or synthetic resin sheet (hereinafter referred to as a "sheet") which is a sheet base; and 3 is a layer of a thermoplastic, thermal shrinking, pressure-sensitive adhesive (hereinafter referred to as an "adhesive layer").

The heat-adhesive paper sheet 1 is one as prepared by forming projections and depressions on the surface of the sheet 2 by creping or embossing, followed by forming the adhesive layer 3 on one surface of the sheet 2.

DESCRIPTION OF THE PREFERRED EMBODIMENT

EXAMPLE 1

For the sheet 2 of the drawing, a fusuma paper having a weight of 100 g/m$^2$ and a thickness of 150 μm was used. For the adhesive layer 3 of the same, a 30 μm film of EVA resin was laminated. The sheet was embossed with an embossing roll, the embossing pattern having a depth of (a) 0 μm, (b) 50 μm or (c) 250 μm. Referring to the iron shrinkage test method for woven fabric and knitted fabric of JIS-L-1057, the adhesive sheet sample was tested, whereupon the elongated or shrunk condition, if any, of the sample was examined. Wrinkles, if formed, were checked with the naked eye. The results obtained are shown in Table 1 below.

TABLE 1

| | Iron | Direct Elongation or Shrinkage | Wrinkles in Boundary | Evaluation (*) |
|---|---|---|---|---|
| B-1 (comparative example) | Dry | −0.5% | Yes | X |
| B-2 (comparative example) | Steam | −0.3% | Yes | X |
| a-1 (comparative example) | Dry | −0.3% | Yes | X |
| a-2 (comparative example) | Steam | −0.4% | Yes | X |
| b-1 (comparative example) | Dry | −0.25% | Yes | X |
| b-2 (comparative example) | Steam | −0.3% | Yes | X |
| c-1 (example of the invention) | Dry | −0.2% | No | ○ |
| c-2 (example of the invention) | Steam | −0.6% | No | ⊙ |

(*) The ironed result was evaluated on the basis of wrinkles, if formed, in the boundary between the hot-pressed area and the non-hot-pressed area. X indicates a poor evaluation; ○ indicates good; and ⊙ indicates the best.

Ironing Condition:
Temperature: 200° C.
Pressure: 7.5 gf/cm$^2$
Speed: 10 cm/sec, for 3 forward-backward movements
Amount of Steam Generated: 8 g/min
The ironing bed used was composed of 10 mm-thick plywood and 0.25 mm paper as attached thereto, covered with 15 g/cm$^2$ rayon paper sheet so that the heat-sensitive adhesive would not adhere to the bed.
Results:
B-1 (No adhesive layer):
This displayed thermal (dry-heat) shrinkage of the paper itself.
B-2 (No adhesive layer):
This displayed wet-heat shrinkage of the paper. The reason why it had less shrinkage than B-1 is because it had a high water content.
a-1:
This displayed less shrinkage than B-1 because the amount of heat transmitted to the heat-sensitive resin was insufficient.
a-2:
This displayed more shrinkage than a-1 because heat conduction by steam was sufficient to cause the heat-sensitive resin to shrink.
b-1 and b-2:
This was almost same as a-1 and a-2, but the amount of transmitted heat was less because of the increased apparent thickness of the paper caused by the embossed projection-depression pattern. As a result, the shrinkage was less than with a-1 and a-2.

c-1:

Thermal conduction to the heat-sensitive resin was insufficient because of the enlarged projection-depression pattern formed by embossing so that the shrinkage was slight. However, with slow heating, a sufficient percentage of shrinkage could be obtained.

c-2:

As compared with c-1, the percentage of shrinkage was higher. This is because thermal conduction was improved due to application of steam, so shrinkage of the heat-sensitive resin was attained. Despite the large percentage of shrinkage, no wrinkles formed in the boundary between the hot-pressed area and the non-hot-pressed area. This is because the embossed projection-depression pattern absorbed the area shrinkage.

Example 2

Linear samples for paintings and calligraphic works, which are stuck by ironing, were prepared by forming a 20 $\mu$m-thick EVA resin on a paper base having a weight of 50 g/m$^2$ and a thickness of 110 $\mu$m, followed by creping them to make the height of the creped projection 0 $\mu$m (sample d), 40 $\mu$m (sample e) or 150 $\mu$m (sample f), respectively. This was subjected to an elongation-shrinkage test with reference to JIS-L-1057, to examine the condition of the tested samples. The results obtained are shown in Table 2 below.

TABLE 2

| | Iron | Direct Elongation or Shrinkage | Wrinkles in Boundary | Evaluation (*) |
|---|---|---|---|---|
| C-1 (comparative example) | Dry | −0.5% | Yes | X |
| C-2 (comparative example) | Steam | −0.3% | Yes | X |
| d-1 (comparative example) | Dry | −0.8% | Yes | X |
| d-2 (comparative example) | Steam | −0.7% | Yes | X |
| e-1 (comparative example) | Dry | −0.8% | Yes | X |
| e-2 (comparative example) | Steam | −0.7% | Yes | X |
| f-1 (example of the invention) | Dry | −0.6% | No | ○ |
| f-2 (example of the invention) | Steam | −0.5% | No | ◉ |

(*) The ironed result was evaluated on the basis of wrinkles, if formed, in the boundary between the hot-pressed area and the non-hot-pressed area. X indicates a poor evaluation; ○ indicates good; and ◉ indicates the best.

Ironing Condition:
Temperature: 180° C.
Pressure: 7.5 gf/cm$^2$
Speed: 10 cm/sec, for one forward-backward movement
Amount of Steam Generated: 4 g/min.

The ironing bed used was composed of 10 mm-thick plywood and 0.25 mm paper as attached thereto, covered with 15 g/cm$^2$ rayon paper sheet so that the heat-sensitive adhesive would not adhere to the bed.

Results:

As compared with the samples of Example 1, thermal conduction of the samples of the present example was better and the percentage of shrinkage was greater since the thickness of the linear was ½ of that of the fusuma paper of Example 1. Therefore, the heat-sensitive resin in the present example shrank more than that in Example 1, but almost the same results as those in Example 1 were obtained by the present example with respect to the presence or absence of the creped pattern or the size of the creped projections and depressions. In samples f-1 and f-2, no wrinkles formed in the boundary between the hot-pressed area and the non-hot-pressed area despite the large percentage of shrinkage. This is because the creped projections and depressions absorbed the area shrinkage, as in the case of Example 1.

Example 3

This example shows a comparison of the adhesion strength of two heat-adhesive paper sheet samples each having a different embossed projection-depression pattern with different ironing. The results are shown in Table 3 below.

TABLE 3

| Ironing | Small Projection-Depression Pattern | Large Projection-Depression Pattern |
|---|---|---|
| Dry | 40 g | 10 g |
| Steam | 128 g | 32 g |

Evaluation Method:

In accordance with the laminate sheet layer peeling strength test method of JIS-P-8139, the peeling strength was measured to be the adhesion strength.

Ironing Condition:
Temperature: 200° C.
Pressure: 7.5 gf/cm$^2$
Speed: 10 cm/sec, one time
Amount of Steam Generated: 8 g/min.

Results:

① Regarding the size of the embossed projection-depression pattern, the adhesion strength of the sample having a smaller projection-depression pattern is larger. From the result, it is understood that the adhesion strength is influenced by the contact area.

② Regarding the ironing by the dry-ironing or steam-ironing, it is understood that the steam-ironed sample had roughly three times the peeling strength of the dry-ironed sample, irrespective of the size of the embossed projection-depression pattern. The result indicates that the amount of the transmitted heat in steam ironing is three times larger than that in dry ironing, from which it is understood that the steam ironing less likely causes uneven adhesion than the dry ironing less likely causes uneven adhesion than the dry ironing.

Example 4

The percentage of heat shrinkage and elongation in water of various heat-adhesive paper sheet samples was measured, and the results obtained are shown in Table 4 below.

TABLE 4

| Kind of Paper | Heated, 5 minutes | In Water, 5 minutes | Maximum Elongation |
|---|---|---|---|
| g | −0.4% | 1% | 1.4% |
| h | −0.4% | 2.5% | 2.9% |
| i-1 | −0.6% | −0.15% | 0.45% |
| i-2 | −0.75% | −0.30% | 0.45% |

TABLE 4-continued

| Kind of Paper | Heated, 5 minutes | In Water, 5 minutes | Maximum Elongation |
|---|---|---|---|
| i-3 | −0.90% | −0.90% | 0% |

Measurement Condition:

Using a JIS in-water elongation measuring machine, heat shrinkage and in-water elongation of the test pieces above were continuously measured. In measurement of heat shrinkage, hot air having a constant temperature of 120° C. was applied to the test pieces for 2 minutes.

Subsequently, the in-water elongation was measured by dipping the test pieces in water for 5 minutes. After thus dipped, the elongated size of each piece was measured.

The test samples were as follows:
g: wallpaper base (pulp 100%)
h: fusuma paper base (containing rayon)
i-1: 20% hydrophobic thermal shrinkage fiber-containing paper
i-2: 30% hydrophobic thermal shrinkage fiber-containing paper
i-3: 100% hydrophobic thermal shrinking fiber paper Results:

① Regarding percentage of the heat shrinkage, i-1, i-2 and i-3 samples had a larger value than g and h samples. This is considered in the former i-1, i-2 and i-3 samples would have shrunk.

② Regarding the in-water elongation, g and h samples showed 1 to 2.5% elongation, while i-1, i-2 and i-3 samples were shorter than the original length. However, with respect to the maximum elongation percentage, which indicates elongation of a previously heat-shrunk sample after being dipped in water for 5 minutes, all the g, h, i-1 and i-2 samples were elongated. However, the maximum elongation percentage of i-1 and i-2 samples was $\frac{1}{3}$ to 1/6 of that of g and h samples. The former two showed a slightly minus elongation from the original test before heated. The i-3 sample showed no elongation from shrunken size by heat.

Where a heat-adhesive paper sheet is stuck to an object with a household iron, it is desirable if the sheet shrinks in some degree during ironing and does not elongated after the ironing operation. From this viewpoint, i-1, i-2 and i-3 samples are better than g and h samples.

INDUSTRIAL FEASIBILITY

The heat-adhesive sheet of the present invention may well be adhered to an object having a somewhat rough and uneven surface, since the heat-sensitive adhesive layer of the sheet may easily be fused. In addition, using a steam iron, it may be well applied to the surface of an object at a relatively low temperature under light pressure without forming wrinkles in the stuck sheet. Therefore, it may be preferable for use as fusuma paper in a Japanese style house, a backing layer for Original paintings and calligraphic works, an overcoating sheet for walls, ceilings and doors of ordinary houses, and as a liner for plywood.

I claim:

1. A heat-adhesive paper sheet which adheres by the pressure of a steam iron without causing creases on an outer surface of said sheet, said sheet comprising:

a steam-permeable paper sheet material having a uniform projection-depression pattern formed by creping, said pattern having a height ranging from $\frac{1}{2}$ to 50 times the thickness of the sheet, and a layer of thermoplastic, thermal shrinking, pressure-sensitive adhesive having a melting point in the range Of 60° C. to 150° C. provided on one surface of the paper sheet material, said layer having a thickness in the range of approximately 10 to 100 μm.

2. A heat-adhesive paper sheet which adheres by pressure with a steam iron without causing creases on an outer surface of said sheet, said sheet comprising:

a steam-permeable paper sheet material having a uniform projection-depression pattern formed by embossing, said pattern having a height ranging from $\frac{1}{2}$ to 50 times the thickness of the sheet, and a layer of thermoplastic, thermal shrinking, pressure-sensitive adhesive having a melting point of 60° C. to 150° C. provided on one surface of the paper sheet material, said layer having a thickness in the range of approximately 10 to 100 μm.

3. A heat-adhesive paper sheet which adheres by pressure with a steam iron without causing creases on an outer surface of said sheet, said sheet comprising:

a steam-permeable paper sheet material having one surface thereof embossed with an embossing roll having an embossing pattern thereon so as to provide a uniform projection-depression pattern on said one surface, with a depth ranging from $\frac{1}{2}$ to 50 times the thickness of said sheet, and a thermoplastic, thermal shrinking, pressure-sensitive adhesive layer having a melting point of 60° C. to 150° C., coated on one side of said paper sheet material, said adhesive layer having a thickness in the range of approximately 10 to 100 μm.

4. A heat-adhesive paper sheet as in claimed in any one of claims 1 to 3, in which said steam-permeable paper sheet material is a paper material containing hydrophobic thermal shrinking fibers ranging from 5 to 100% of said paper sheet material.

5. A heat-adhesive paper sheet as claimed in any one of claims 1 to 3, in which said steam-permeable paper sheet material is selected from the group consisting of a synthetic resin sheet with a liner composed of wood pulp and hydrophobic thermal shrinking fibers, a fibrous paper made of only thermal shrinking fibers, and a fibrous paper partly containing thermal shrinking fibers.

6. A heat-adhesive paper sheet as claimed in any one of claims 1 to 3, in which said thermoplastic, thermal shrinking, pressure-sensitive adhesive is selected from the group consisting of EVA, EEA, EAA, ionomer resins, urethane resins and derivatives thereof.

7. A heat-adhesive paper sheet as claimed in any one of claims 1 to 3, in which said steam-permeable paper sheet material has said thermoplastic, thermal shrinking, pressure-sensitive adhesive layer provided on one surface thereof and has a material selected from the group consisting of a woven fabric, knitted fabric, non-woven fabric, heat resistant synthetic resin layer, thin cork skin, thin wood skin, metal foil, mineral net and leather, laminated on the opposite surface thereof.

8. A heat-adhesive paper sheet as claimed in any one of claims 1 to 3, in which said steam-permeable paper sheet material contains inorganic fibers.

* * * * *